3,324,007
FLUID SEAL AND NUCLEAR REACTOR
SYSTEM INCLUDING SAME
Harry Baxter, Whetstone, England, assignor to The English Electric Company Limited, London, England, a British company
Filed Sept. 22, 1965, Ser. No. 489,237
Claims priority, application Great Britain, Oct. 2, 1964, 40,194/64
5 Claims. (Cl. 176—40)

This invention relates to fluid seals for effecting sealing between a first member and a second member between which limited relative linear movement is possible in any direction.

According to the invention, such a seal comprises a first sealing surface on said first member, a second sealing surface on said second member inclined at an angle of less than 180° to the first sealing surface, said angle being no greater than the greatest angle by which either said sealing surface is inclined to the horizontal, a plurality of sealing blocks each resting in sliding contact with both said sealing surfaces, and a seal face formed at each end of each sealing block in sliding overlapping engagement with a corresponding seal face of each next adjacent block, whereby to maintain sealing between mutually-adjacent blocks on partial separation of the said mutually-adjacent blocks.

According to a preferred feature of the invention, said first and second sealing surfaces are generally circular, said blocks constituting a ring of blocks so that on relative movement occurring between said first and second members the ring of blocks can change its radius while still maintaining sealing between the members.

According to another preferred feature of the invention, each said sealing surface comprises a plurality of flat facets, each facet of said first sealing surface and the corresponding facet of said second sealing surface having one said block resting thereon.

According to a further preferred feature of the invention, each said block is of graphite.

A fluid seal according to the invention, incorporated in a gas-cooled nuclear reactor, will now be described by way of example and with reference to the accompanying drawings, of which:

Figure 1:
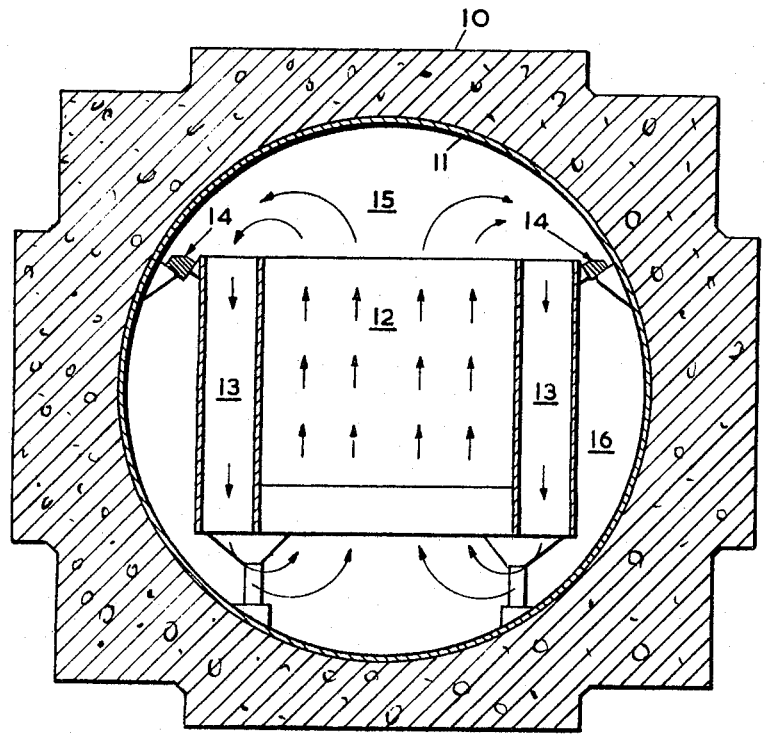
FIG. 1 is a simplified sectional elevation of the nuclear reactor.

With reference firstly to FIG. 1, a gas-cooled nuclear reactor comprises a concrete pressure vessel 10 with a spherical internal surface having a steel liner 11. Within the pressure vessel 10 there is mounted a graphite structure 12 including the moderator of the reactor, and surrounded by an annular heat exchanger 13. In operation, coolant gas is circulated by blowers (not shown) in a general sense indicated by arrows in FIG. 1, up through the graphite structure 12, which contains nuclear fuel in fuel channels (not shown), and thence downwardly through the heat exchager 13 and back through the structure 12.

A seal generally indicated at 14 is arranged around the top upper edge of the heat exchanger 13, to prevent coolant gas from passing from the space 15 above the graphite structure into the space 16 surrounding the heat exchangers 13 (and thereby preventing the gas from by-passing the heat exchanger), and also to allow a pressure difference to exist between the gas in the space 15 and that in the space 16.

Figure 2:
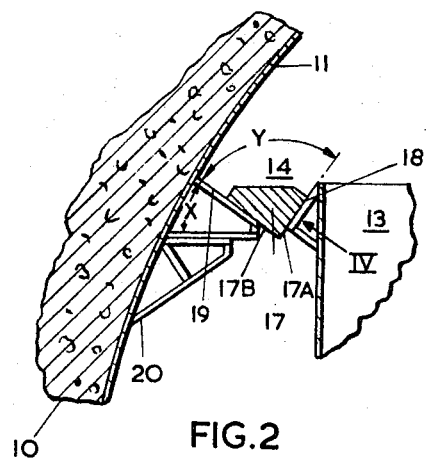
FIG. 2 is an enlarged view of part of FIG. 1 showing the seal in greater detail.
Figure 3:
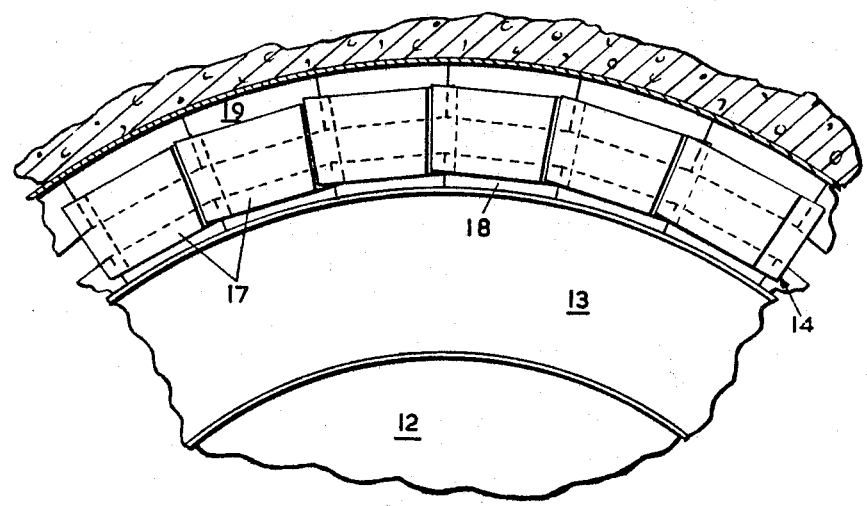
FIG. 3 is a plan view of part of the seal in position in the reactor.
Figure 4:
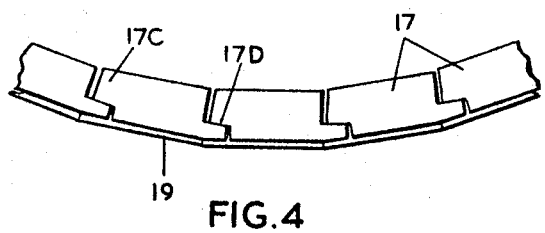
FIG. 4 is an elevation of the seal taken in the direction of the arrow IV in FIG. 2, but with the parts designated 13 and 18 in FIG. 2 omitted.

With reference now to FIGS. 2 to 4, the seal 14 comprises a number of graphite sealing blocks 17 of approximately V-section, resting on an inclined circumferential seal plate 18 fixed around the heat exchanger 13 and also resting on another inclined circumferential seal plate 19. The latter is fixed to the liner 11 and supported by brackets 20 opposite the seal plate 18. Two sliding faces 17A and 17B of each block 17 are free to slide if necessary across the seal plates 18 and 19 respectively in a radial direction as seen in FIG. 3. Each sealing block 17 has a stepped portion 17C at each end, arranged so that the sealing faces 17D on the stepped portion 17C of adjacent blocks 17 are in intimate sealing engagement with each other whatever the radial position of the sealing plates.

In operation, the gas pressure in space 15 is higher than that in space 16, so that the sealing blocks 17 are urged by the action of this pressure difference into close sealing contact with the sealing plates 18 and 19, thereby (together with the co-operating faces 17D at the ends of the sealing blocks 17) sealing the space 15 from the space 16. If relative movement occurs between the heat exchanger 13 and the pressure vessel 10, due for example to thermal expansion of the heat exchanger or Wigner effects in the graphite structure 12, the face 17B of each block 17 slides up the seal plate 19 (radially as seen in FIG. 3) while maintaining its sealing action.

The angle of inclination of the seal plate 19 to the horizontal (as indicated at X in FIG. 2) is preferably made as nearly as possible so that the plate 19 lies in a plane corresponding to the direction in which the seal plate 18 moves: but any variations from this direction are accommodated by relative sliding movement between the face 17A of each block and the seal plate 18.

The seal plates 18 and 19 may each consist of a series of flat facets corresponding with the blocks 17, the faces 17A and 17B of the sealing blocks also being flat and the ends 17C being chamfered as necessary to enable the ends 17C to overlap from one facet of the seal plates to the next, as is best seen in FIG. 4. Alternatively, the plates 18 and 19 may each be in the form of a continuous curve, in which case the faces 18 and 19 are curved correspondingly in order to engage the plates 18 and 19 intimately.

As the sealing blocks 17 move outwardly, the effective radius of the seal 14 increases so that adjacent blocks 17 tend to move away from each other: this movement is accommodated by relative sliding movement between the faces 17D (FIG. 4) of adjacent blocks 17.

The angle (indicated at Y in FIG. 2) between the seal plates 18 and 19 may be 90° or of any other convenient value.

Seals such as those described may be used in nuclear reactors using other coolants, for example liquids: and in other applications besides nuclear reactors. In applications where there is no pressure difference between the fluid or fluids on two sides of the seal, or insufficient pressure difference to ensure efficient sealing, suitable restraining means may be provided to urge the blocks 17 against the corresponding sealing plates 18, 19.

The sealing blocks 17 need not be of graphite, but may be of any other suitable form. Alternatively they may be of a suitable metal or ceramic material: but in this case, if the sealing surfaces are to be capable of sliding relatively to each other without the need for lubrication, some or all of the sliding surfaces may have to be coated with a suitable anti-sticking material (for example polytetrafluorethylene). Such anti-sticking materials, and the material of the sealing blocks, must however be chosen so as to be compatible with the physical and chemical conditions in which they have to be used if the seal is employed in a nuclear reactor. Alternatively or in addition, means for lubricating the seal can be provided.

It will be understood that, by virtue of the ability of the sealing blocks 17 to move relatively to both the seal plates 18 and 19, sealing between the spaces 15 and 16 is maintained irrespective of the actual direction of linear movement of the heat exchanger 13 relative to the pressure vessel 11. Furthermore, since the blocks 17 can move relatively to each other (the faces 17D sliding against each other) sealing will also be maintained if the movement of the heat exchanger is asymmetrical with respect to the vertical axis of the pressure vessel.

The ends 17C of the sealing blocks 17 may if desired be suitably modified, for example by the introduction of labyrinth grooves on the faces 17D, or of grooves containing suitable resilient sealing means bearing on the mutually-engaging faces 17D.

Seals such as those described may be used in highly lubricated conditions, according to the grade of graphite used for the blocks 17 (if they are of graphite) at temperatures of up to approximately 600° C.

What I claim as my invention and desire to secure by Letters Patent is:

1. A fluid seal for effecting sealing between a first member and a second member between which limited relative linear movement is possible in any direction, comprising a first sealing surface on said first member, a second sealing surface on said second member inclined at an angle of less than 180° to the first sealing surface, said angle being no greater than the greatest angle by which either said sealing surface is inclined to the horizontal, a plurality of sealing blocks each resting in sliding contact with both said sealing surfaces, and a seal face formed at each end of each sealing block in sliding overlapping engagement with a corresponding seal face of each next adjacent block, whereby to maintain sealing between mutually-adjacent blocks on partial separation of the said mutually-adjacent blocks.

2. A fluid seal according to claim 1, in which said first and second sealing surfaces are generally circular, said blocks constituting a ring of blocks so that on relative movement occurring between said first and second members the ring of blocks can change its radius while still maintaining sealing between the members.

3. A fluid seal according to claim 2, wherein each said sealing surface comprises a plurality of flat facets, each facet of said first sealing surface and the corresponding facet of said second sealing surface having one said block resting thereon.

4. A fluid seal according to claim 1, wherein each said block is of graphite.

5. A fluid seal according to claim 2, wherein said first member is a nuclear reactor pressure vessel and said second member is an assembly including a reactor core mounted within said pressure vessel, both the pressure vessel and the said assembly being generally symmetrical about a common vertical axis and said fluid seal being arranged around the top of said assembly.

No references cited.

REUBEN EPSTEIN, *Primary Examiner.*